United States Patent [19] [11] 4,145,283
Topp et al. [45] Mar. 20, 1979

[54] PROCESS FOR THE PURIFICATION OF WASTE WATER

[75] Inventors: Alwin Topp, Hofheim am Taunus; Klaus Schmiedel, König-Stein, Taunus; Georg Schaeffer, Hofheim am Taunus, all of Fed. Rep. of Germany

[73] Assignee: Hoechst Aktiengesellschaft, Frankfurt (Main), Fed. Rep. of Germany

[21] Appl. No.: 860,374

[22] Filed: Dec. 14, 1977

[30] Foreign Application Priority Data

Dec. 16, 1976 [DE] Fed. Rep. of Germany ....... 2657011

[51] Int. Cl.$^2$ ............................................... C02C 5/04
[52] U.S. Cl. .................................. 210/63 R; 568/742; 568/753; 568/751; 568/738; 568/769
[58] Field of Search ................ 210/63 R; 260/621 A, 260/627 R, 628

[56] References Cited

U.S. PATENT DOCUMENTS

| 2,665,249 | 1/1954 | Zimmerman | 210/63 R |
|---|---|---|---|
| 2,760,992 | 8/1956 | Schoeffel et al. | 260/628 |
| 2,856,437 | 10/1958 | Cake | 260/628 |
| 3,426,083 | 2/1969 | Otten et al. | 260/628 |
| 3,907,678 | 9/1975 | Pradt et al. | 210/63 R |
| 4,026,791 | 5/1977 | Wallace | 260/621 A |

OTHER PUBLICATIONS

Lund, H. F., *Industrial Pollution Control Handbook*, McGraw Hill, Inc.; 1971, pp. 14-19 through 14-22.

*Primary Examiner*—Charles N. Hart
*Assistant Examiner*—Benoit Castel
*Attorney, Agent, or Firm*—Curtis, Morris & Safford

[57] ABSTRACT

The waste water being formed upon the preparation of hydroxy aromatics, preferably of resorcinol and β-naphthol, by caustic alkaline melt of the corresponding aryl-sulfonic acids or aryl sulfonates is purified by wet oxidation with oxygen or oxygen-containing gases at temperatures of from about 100° to 370° C. and under a pressure of from about 1 to 300 bars. The COD-decomposition rates amount to about 90% and more.

When a hydroxy aromatic is prepared by means of a caustic soda melt, this process provides a sulfate, especially sodium sulfate, which is of sufficient purity for further use without complementary purification stages. The obtention of the pure salt is important for the economy of the process.

8 Claims, No Drawings

PROCESS FOR THE PURIFICATION OF WASTE WATER

The present invention relates to a process for the purification of waste water that is formed when hydroxy are prepared by caustic alcaline melts of alkaline-sulfonic acids or aryl-sulfonates, coupled with the obtention of alkaline sulfate, especially of sodium sulfate, which may be used directly for commercial purposes.

It is known that hydroxy aromatics such as phenols, resorcinol, naphthols, hydroxy anthraquinones etc. may be obtained from the corresponding aryl-sulfonic acids or aryl-sulfonates by exchanging the sulfo groups for the hydroxyl groups. This exchange is technologically carried out by melting with caustic alkaline substances, especially with sodium hydroxide (NaOH). Technologically very important is, for example, the preparation of β-naphthol and resorcinol by the sodium hydroxide melting of naphthalene-2-sulfonic acid or naphthalene-2-sulfonate and of benzene-1,3-disulfonic acid or benzene-1,3-disulfonate. The process technique is generally such that the products which are formed from naphthalene-2-sulfonic acid or benzene-1,3-disulfonic acid or from the corresponding sulfonates and sodium hydroxide, are dissolved in water or in an aqueous saline solution and the strong alkaline bases obtained are subsequently neutralized, preferably with sulfur dioxide or sulfuric acid. If necessary, part of the salt precipitate may also be separated e.g. by centrifugation, either prior to or after neutralization. The β-naphthol is separated as a second phase after neutralization and the readily water-soluble resorcinol is separated by extraction. Since the neutralizing reaction is preferably carried out with sulfur dioxide and especially with sulfuric acid, there are obtained not only the desired hydroxy aromatics and sodium sulfite, but additionally large quantities of sodium sulfate. As a rule, the total resulting salt is several times the quantity of hydroxy aromatics.

This process has the disadvantage that large quantities of salt are formed which are contaminated with organic compounds; this salt (-mixture) can be used in exceptional cases only, for example for cellulose plants. Generally these polluted salts cannot be used further, nor is it possible to dissolve the salts in water and to remove them without further treatment together with the waste water, because such a process causes unacceptable environmental pollution. The biological purification of the waste water raises great problems due to the toxicity of sodium sulfite. A biological purification must remain expensive and inefficient even after the removal of the sodium sulfite, due to the high COD (chemical oxygen demand) and the large salt content, since organic contaminations of the aromatic type are difficult to decompose and the quantity of salt discharge remains high. Therefore, technological installations are restricted to render the sulfite harmless by oxidation or by expelling sulfur dioxide, e.g. by means of sulfuric acid. Normally, it is not possible to obtain a sodium sulfate of marketable degree of purity which makes it interesting for commercial purposes, without a preceding separation of the organic contaminations, which separation would require a rather expensive crystallization operation, or without a costly and complicated after-treatment.

For the sake of environmental protection, however, the elimination of organic contaminations and of the high salt content in the waste water are urgent requirements. The present invention provides a process for purifying waste waters formed by the preparation of hydroxy aromatics by a caustic alkaline melt of aryl-sulfonic acids or arylsufonates that is not only simple and economical, but also provides, as by-product, a salt of sufficient purity that it is suitable for further direct use.

The present invention solves these problems by subjecting the waste liquor being formed upon the preparation of hydroxy aromatics by caustic alkaline melts of aryl sulfonic acids or aryl sulfonates, to a wet oxidation process with oxygen or oxygen-containing gases at elevated temperature and under elevated pressure.

The object of the present invention is, therefore, a process for purifying waste water by wet oxidation with oxygen or oxygen-containing gases at temperatures from about 100° to 370°, preferably from about 180° to 300° C. and under a pressure of from about 1 to 300 bar, preferably from about 30 to 150 bar, which comprises subjecting to said wet oxidation the waste water being formed upon preparation of hydroxy aromatics — especially of resorcinol and β-naphthol, especially upon the preparation of hydroxy aromatics by caustic alkaline melt of aryl-sulfonic acids or aryl-sulfonates; dissolving the molten product in water or in an aqueous saline solution; neutralizing the strong alkaline base obtained with sulfur dioxide or with sulfuric acid; and separating the salts eventually precipitating and the hydroxy aromatics from their neutralized bases in a usual manner.

In principle, the hydroxides of all alkaline metals may be used as caustic alkaline substances for the caustic alkaline melt; however, it is technologically advantageous to use only caustic sodium hydroxide or possibly caustic potassium hydroxide in the process.

The aryl-sulfonic acid or aryl-sulfonates accessible by the process may be aromatic sulfonic acids or sulfonates having one or several aromatic rings, optionally also condensed aromatic rings, to which may be attached one or several sulfonic acid groups or sulfonate groups. The compounds may also be substituted, of course, by substituents that do not react in the caustic alkaline melt ("inert" substituents such as alkyl groups, etc.).

The following aryl-sulfonic acids or sulfonates may be cited as examples: Benzene-sulfonic acid, benzene-1,3-disulfonic acid, p-ethyl-benzene-sulfonic acid, naphthalene-1-sulfonic acid and naphthalene-2-sulfonic acid, naphthalene-2,7-disulfonic acid, fluorene-1-sulfonic acid, metanilic acid α- and β-anthraquinone-sulfonic acid, etc. or the salts of these sulfonic acids. Preferred aryl-sulfonic acids or sulfonates are naphthalene-2-sulfonic acid or sulfonate and benzene-1,3-disulfonic acid or disulfonate. The sulfonates may be any possible salts of the sulfonic acids; however, the alkali metal salts, especially the sodium salts, are the preferred salts. Upon the forming of the caustic alkaline melt, there are at first formed, per se practically exclusively those sulfonates, the metal ion of which is the alkali metal ion of the alkali hydroxide used.

The caustic alkaline melt and the work-up of the same by dissolution of the molten product in water or in an aqueous saline solution, by neutralization of the strongly alkaline base obtained with sulfur dioxide or sulfuric acid and by separation of the possibly precipitating salts and of the hydroxy aromatics from the neutralized base, is carried out in a usual and known manner. This known work-up method is followed by the present invention which comprises subjecting the neutralized base, which has been freed from the salts possibly precipitated and from the main quantity of hydroxy aromatics, to a wet oxidation with oxygen or oxygen-containing gases under the aforedescribed temperature and pressure conditions. This wet oxidation is preferably carried out with air and at salt concentrations just below the solubility limit. The sodium sulfite may optionally be oxidized in a separate preceding apparatus to yield sodium sulfate, though the simultaneous oxidation of sodium sulfite and the organic contaminations is preferably in a joint apparatus (reactor). The pH of the waste liquor changes during the oxidation process. If the oxidation is carried out in the neutral range, e.g. because of the material used, an alkali base, preferably sodium hydroxide solution, is normally added to the waste liquor. If an acid-proof material is used for the oxidation apparatus, an alkali addition may not be necessary. This processing method is preferred since no additional alkali is consumed and since the COD (chemical oxygen demand) i.e., the amount of oxygen required to oxidize inorganic as well as organic oxidizable compounds in the sample by methods such as the chromate method decomposition rate and thus the oxidation speed increases the more the pH-value decreases. The COD-decomposition rate is that part of the theoretical oxygen demand which is actually consumed. The COD-rate may optionally be increased by adding catalysts, especially heavy metal salts such as copper or zinc salts. However, the addition of heavy metal salts also causes additional costs for the catalyst and the recovery of this catalyst.

The wet oxidation according to the invention may be carried out either continuously or discontinuously. In order to oxidize as completely as possible the components of the base suitable for oxidation, at least a stoichiometric quantity of oxygen must be supplied to the wet oxidation reaction, i.e. the oxygen quantity has to be sufficient to oxidize the total sulfite to yield sulfate and the total organic substances to yield essentially $CO_2$ and water. Though an oxygen excess improves the oxidation, it also brings about higher compression costs. The oxidation may be carried out technically in various apparatus, for example in a flow tube, a jet nozzle reactor, a bubble column or in a one-stage or several-stage apparatus with agitation. Laboratory scale operations simply use an autoclave with agitator or shaker.

The oxygen (or oxygen-containing gas) used for the reaction, and the base to be oxidized, may be preheated either combined or separately. For this purpose there may be used an external heating medium; preference is given, however, to the waste liquor leaving the reactor while still hot. The in-flow is then used as cooling means for the oxidized waste liquor. No additional energy is required. On the contrary, by expansion of the oxidized base, which is hotter due to the oxidation heat, additional vapor may be obtained.

While a period of about 15 minutes to 2 hours is generally sufficient for the oxidation with high decomposition rates, the oxidation time generally does not exceed some 30 to 60 minutes. However, for low pH values the reaction periods are within the lower range of the reaction time indicated whereas at higher pH-values the reaction time is within the higher range.

The salts (i.e. the respective sulfates) formed are then removed from the base subjected to wet oxidation, e.g. by crystallization and filtration. If the process has been carried out with the use of a caustic sodium hydroxide melt as caustic alkaline melt, crystalline sodium sulfate deca hydrate ($Na_2SO_4 \cdot 10H_2O$) crystallizes from the oxidized liquor. By evaporating the crystal-water of the sodium sulfate decahydrate, there may be obtained very pure sodium sulfate. It is now possible, if desired, to subject the mother liquors containing little salt and having a low chemical oxygen demand. For to a biological final purification; for a continuous operation of the process according to the invention, a preferred method is, however, to recycle said mother liquors into the process and to use them as aqueous saline solutions for dissolving the melt products of the caustic alkaline melt. In a discontinuous operation of the process according to the invention the mother liquors are re-used as aqueous saline solution for another batch. Any waste problems are thus solved. The large quantities of sodium sulfate thus obtained are very pure and may therefore be marketed directly.

This feature is an essential advantage of the process according to the invention as compared to the process according to the state of the art. Another especially important feature of the process is that due to the oxidation with oxygen or with an oxygen-containing gas, a method that in principle does not require any additions of catalysts or the like, no foreign ions detrimentally affecting the quality of sodium sulfate reach the waste waters. The process according to the invention operates extremely economically, firstly because the wet oxidation can be considered as a substitute for sulfite-destructing environmental protection devices that are required for industrial waste water purification plants, and secondly because very pure sodium sulfate can be obtained merely from pre-purified waste liquors (slightly polluted by organic contaminations only), with minimum efforts and costs, thus avoiding increased crystallization expenditure or expensive final treatment of the sodium sulfate.

Though wet oxidations with oxygen or oxygen-containing gases in the temperature and pressure range of the process according to the invention are known for the purification of municipal and industrial waste waters, sewage sludge, etc., they either provide COD-decomposition rates too low for solving the basic problem of the invention, or they require catalysts to obtain higher COD-decomposition rates.

According to "Chemical Engineering" Aug. 25, 1958, pages 117 to 120, especially page 118 (FIG. 2 and abstract) wet oxidation of various kinds of waste waters, waste substances, etc. may achieve COD-decomposition rates of about 80% only at temperatures of above 450° F. (corresponding to about 235° C.).

Austrian Pat. No. 216,430 which describes the wet oxidation of waste water sludges at temperatures of from 170° to 320° C. and under pressures of from 21 to 210 kg/cm$^2$, only mentions COD-decomposition rates of from 60 to 85%.

In "Surveyor" dated Sept. 7, 1973, page 2, are indicated COD-decomposition rates of only up to 65% for high-efficiency-oxidation plants for the treatment of sewage sludge.

However, COD-decomposition rates of only about 80% to a maximum of 85% do not suffice to treat waste water derived from the preparation of hydroxy aromatics. Such rates are especially insufficient if a directly marketable (sodium) sulfate is to be obtained without any intermediate purification steps. For that purpose COD-decomposition rates of about 90% and more are an indispensable requirement.

Considering the object of the invention, namely the purification of the waste water derived from the preparation of hydroxy aromatics in a technically simple and economically reasonable way, providing also a pure and directly utilizable sulfate, especially a sodium sulfate, the use of known wet oxidation processes for purifying waste water derived from the preparation of hydroxy aromatics, did not promise success or seem obvious.

In contradiction to the state of the art, that might cause an expert to refrain from applying these processing methods, the present invention has nevertheless used known wet oxidation processes to waste water derived from the preparation of hydroxy aromatics. The result, COD-decomposition rates of about 90% and more, so that the sulfate obtained by the process is indeed extremely pure, is highly surprising and could in no way be foreseen.

The wet oxidation process that is applied especially in the industrial field for purifying the waste water of acrylonitrile plants necessitates various catalysts for achieving a high COD-decomposition in order to keep within the temperature and pressure ranges of known wet oxidation processes. Such catalysts may even be dispensed with during the process of the invention when the above mentioned high COD-decomposition rates of about 90% or more have to be achieved. The fact that the process according to the invention brings about an almost complete oxidation of the substantially aromatic contaminations which are known to be difficult to decompose, such as alkali metal salts of aryl-sulfonic acids, of hydroxyl-aryl-sulfonic acids and further components being so far widely unknown due to their difficult analyses, by means of a wet oxidation within the usual temperature and pressure ranges without adding any catalysts, was a surprise and could not be expected.

Surprisingly, no reactions leading to the formation of resin and sludge susceptible of jeopardizing the processing techniques according to the invention occur, despite the rather high temperatures.

The following Examples illustrate the invention. The sulfite bases used for wet oxidation in the Examples for (composition, see Tables 1 and 2) are obtained from products melted with caustic sodium hydroxide according to known technological processes for the preparation of β-naphthol and resorcinol. The products melted together with caustic sodium hydroxide were dissolved in water, β-naphthol or resorcinol being set free from their salts with sulfuric acid or sulfur dioxide and separated by a known and common technology. The sulfite liquors obtained, having a pH value of from 5 to 10, were used for wet oxidation.

EXAMPLES 1-12

Discontinuous Tests

A test apparatus consisting of an electrically heated 2 liter-refined steel autoclave or a 1 liter-titanium autoclave, each equipped with a magnetic stroke agigator, reflux condenser, inlet tubes for gas and liquids, discharge valve for gas and liquids, was employed. 1 liter or 500 ml., respectively, of sulfite liquor were introduced and heated to the desired temperature. The test started with opening the pressure-regulating valve for compressed air. The desired quantity of waste gas, which could be measured by means of a gasometer, could be adjusted by opening the gas outlet valve. The agitator operated at 60 strokes per minute. Table 1 shows the test results. In all cases, 100% of the sulfite was transformed into sulfate and the C-COD-decomposition (the percentage of the theoretical COD which is necessary or consumed by the organic compounds of the sample) was between 80 and 99%. Tests carried out with shorter residence times or lower temperatures and thus at inferior C-COD-decomposition rates were not taken up in the table, due to the risk that inferior quality grades of sodium sulfate may be obtained in those cases.

Table 1

| Examples Test | 1 | 2 | 3 | 4 | 5 | 6 | 7 | 8 | 9[+)] | 10 | 11 | 12 |
|---|---|---|---|---|---|---|---|---|---|---|---|---|
| starting liquor salt content (wgt.-%) | 23.9 | 17.6 | 18.4 | 18.4 | 18.4 | 18.4 | 21.7 | 21.7 | 21.7 | 23.5 | 25.4 | 30.3 |
| COD (g $O_2$/l) | 37.2 | 33.6 | 41.1 | 41.1 | 41.1 | 41.1 | 32.2 | 32.2 | 32.2 | 34.0 | 48.5 | 38.1 |
| C-COD (g $O_2$/l) | 19.9 | 7.0 | 17.5 | 17.5 | 17.5 | 17.5 | 19.2 | 19.2 | 19.2 | 17.6 | 17.5 | 38.0 |
| reaction conditions: | | | | | | | | | | | | |
| temperature (° C) | 250 | 250 | 250 | 250 | 250 | 220 | 250 | 300 | 250 | 250 | 250 | 250 |
| pressure (bar) | 70 | 70 | 70 | 70 | 70 | 50 | 70 | 150 | 70 | 70 | 70 | 70 |
| reaction time (min.) | 30 | 45 | 60 | 60 | 30 | 30 | 30 | 30 | 30 | 45 | 30 | 30 |
| oxidized liquor: | | | | | | | | | | | | |
| pH-value | 2.4 | 5.5 | 7.0 | 5.0 | 2.4 | 2.4 | 2.4 | 2.4 | 2.4 | 0.9 | 2.5 | 3.6 |
| COD-decomposition (%) | 94.6 | 95.8 | 91.5 | 95.9 | 96.1 | 94.9 | 94.4 | 97.5 | 99.2 | 92.4 | 96.7 | 95.8 |
| C-COD-decompos. (%) | 90.5 | 80.0 | 80.0 | 90.3 | 90.8 | 88.0 | 90.4 | 95.7 | 98.7 | 85.2 | 90.7 | 95.8 |

COD = Chemical oxygen demand
C-COD = Chemical oxygen demand of the organic contaminations
[+)]$CuSO_4$ was added as catalyst in Example 9.

EXAMPLES 13-18

Continuous Tests

Identical apparatus was used for the continuous and discontinuous tests. The feed-in of the products was carried out with a metering pump; the oxidized waste liquor was removed through an immersed duct, cooler and valve. The waste gas quantity and thus, indirectly, the fed-in quantity of air were normally adjusted to oxygen concentrations in the waste gas of 1-6 vol.%, corresponding to an oxygen conversion rate of about 70-95%.

The tests were carried out as described for the discontinuous test. The metering pump was then switched on and the oxidized liquor let off the autoclave proportionately. Quantity and oxygen concentration of the waste gas were measured constantly. After the test was running for several hours, the system had reached equilibrium, as indicated by constant analysis values of the waste liquor samples. The tests were carried out either in one passage or in several passages in order to simulate the cascade. The results appear in Table 2.

Table 2

| Examples Test parameter | 13 | 14 | 15 | 16 | 17 | 18 |
|---|---|---|---|---|---|---|
| starting liquor: | | | | | | |
| salt content (wgt.-%) | 23.9 | 25.4 | 25.4 | 23.5 | 21.7 | 23.9 |
| COD (g $O_2$/l) | 37.2 | 48.5 | 48.5 | 34.0 | 32.2 | 37.2 |
| C-COD (g $O_2$/l) | 19.9 | 17.5 | 17.5 | 17.6 | 19.2 | 19.9 |
| reaction conditions: | | | | | | |
| temperature (° C) | 250 | 250 | 250 | 250 | 250 | 250 |
| pressure (bar) | 70 | 70 | 70 | 70 | 70 | 70 |
| average residence time (min.) | 30 | 30 | 30 | 45 | 30 | 60 |
| number of reaction stages | 2 | 2 | 1 | 3 | 2 | 1 |
| oxidized liquor: | | | | | | |
| pH-value | 2.2 | 2.1 | 2.0 | 1.0 | 2.2 | 7.0 |
| COD-decomposition (%) | 93.3 | 96.1 | 94.1 | 89.5 | 93.5 | 87.7 |
| C-COD-decomposition (%) | 89.0 | 89.2 | 83.4 | 79.6 | 89.1 | 76.6 |

What is claimed is:

1. In a process for the purification of waste water obtained during the preparation of a hydroxy aromatic by caustic alkaline melt of aryl sulfonic acid or aryl sulfonate to form a molten product wherein the molten product is dissolved in water or in an aqueous saline solution, the strongly alkaline liquor obtained is neutralized with sulfur dioxide or sulfuric acid and any precipitating salts and the hydroxy aromatic are separated from the neutralized waste water, the improvement comprising subjecting the neutralized waste water to wet oxidation with oxygen or an oxygen-containing gas at a temperature of rom about 100° to 370° C. under a pressure of from about 1 to 300 bars.

2. The process according to claim 1, which comprises subjecting the waste water obtained upon the preparation of resorcinol by caustic alkaline melt of benzene-1,3-disulfonic acid or benzene-1,3-disulfonate to wet oxidation.

3. The process according to claim 1, which comprises subjecting the waste water obtained upon the preparation of β-naphthol by caustic alkaline melt of naphthalene-2-sulfonic acid or naphthalene-2-sulfonate to wet oxidation.

4. The process according to claim 1, which comprises isolating pure sodium sulfate by crystallization and filtration from the waste water submitted to the wet oxidation.

5. The process according to claim 1 which comprises at least partially recycling a mother liquor obtained by a continuous process of wet oxidation of the waste water and separation of crystallized salts and using the liquor as an aqueous saline solution for the dissolution of the melt.

6. A process according to claim 5 wherein the process is carried out discontinuously and the aqueous saline solution is reused in another batch.

7. A process as in claim 1 wherein the oxygen or oxygen-containing gas is at a temperature of from about 180° to 300° C.

8. A process as in claim 1 wherein the oxygen or oxygen-containing gas is under a pressure of from about 30 to 150 bars.

* * * * *